US012715791B2

(12) United States Patent
Liu et al.

(10) Patent No.: US 12,715,791 B2
(45) Date of Patent: Aug. 25, 2026

(54) RESIN FOR REMOVING PHOSPHORUS FROM WATER BODY, AND PREPARATION METHOD THEREFOR AND APPLICATION THEREOF

(71) Applicant: SUNRESIN NEW MATERIALS CO. LTD., Shaanxi (CN)

(72) Inventors: Heng Liu, Shaanxi (CN); Wenjin Gao, Shaanxi (CN); Suidang Li, Shaanxi (CN); Qiong Liu, Shaanxi (CN); Xiaokang Kou, Shaanxi (CN)

(73) Assignee: SUNRESIN NEW MATERIALS CO. LTD., Shaanxi (CN)

( * ) Notice: Subject to any disclaimer, the term of this patent is extended or adjusted under 35 U.S.C. 154(b) by 434 days.

(21) Appl. No.: 18/044,321

(22) PCT Filed: Dec. 22, 2021

(86) PCT No.: PCT/CN2021/140580
§ 371 (c)(1),
(2) Date: Mar. 7, 2023

(87) PCT Pub. No.: WO2022/135494
PCT Pub. Date: Jun. 30, 2022

(65) Prior Publication Data

US 2023/0331591 A1 Oct. 19, 2023

(30) Foreign Application Priority Data

Dec. 24, 2020 (CN) ........................ 202011553288.7

(51) Int. Cl.

| | |
|---|---|
| ***C02F 1/42*** | (2023.01) |
| ***B01J 39/07*** | (2017.01) |
| ***B01J 39/20*** | (2006.01) |
| ***B01J 47/02*** | (2017.01) |
| ***B01J 47/14*** | (2017.01) |
| ***B01J 49/53*** | (2017.01) |
| ***B01J 49/60*** | (2017.01) |
| ***C02F 1/00*** | (2023.01) |
| ***C08F 212/08*** | (2006.01) |
| *C02F 101/10* | (2006.01) |

(52) U.S. Cl.
CPC ................. *C02F 1/42* (2013.01); *B01J 39/07* (2017.01); *B01J 39/20* (2013.01); *B01J 47/02* (2013.01); *B01J 47/14* (2013.01); *B01J 49/53* (2017.01); *B01J 49/60* (2017.01); *C02F 1/008* (2013.01); *C08F 212/08* (2013.01); *C02F 2101/105* (2013.01); *C02F 2209/18* (2013.01); *C02F 2303/16* (2013.01); *C08F 2810/20* (2013.01)

(58) Field of Classification Search
CPC ...... B01J 20/0207; B01J 47/016; B01J 39/07; B01J 45/00; C08F 212/08; C08F 8/42
See application file for complete search history.

(56) References Cited

U.S. PATENT DOCUMENTS

| | | | |
|---|---|---|---|
| 5,278,193 | A | 1/1994 | Eiffler |
| 2023/0331591 | A1 | 10/2023 | Liu et al. |

FOREIGN PATENT DOCUMENTS

| | | | |
|---|---|---|---|
| CA | 3187096 | A1 | 6/2022 |
| CN | 101289241 | A | 10/2008 |
| CN | 102600810 | A | 7/2012 |
| CN | 104138750 | A | 11/2014 |
| CN | 104788599 | A | 7/2015 |
| CN | 105037601 | A | 11/2015 |
| CN | 105214629 | A | 1/2016 |
| CN | 105566191 | A | 5/2016 |
| CN | 106179537 | A | 12/2016 |
| CN | 107057004 | A | 8/2017 |
| CN | 110003376 | A | 7/2019 |
| CN | 112591851 | A | 4/2021 |
| EP | 4190754 | A1 | 6/2023 |
| WO | 2022135494 | A1 | 6/2022 |

OTHER PUBLICATIONS

Second Office Action dated Jun. 10, 2025 for CA patent application No. 3187096.
International Search Report dated Mar. 22, 2022; International Application No. PCT/CN2021/140580.
Written Opinion dated Mar. 22, 2022; International Application No. PCT/CN2021/140580.
First Office Action of corresponding Chinese Application No. 202011553288.7 dated Apr. 27, 2023.
Second Office Action of corresponding Chinese Application No. 202011553288.7 dated Nov. 9, 2023.

(Continued)

*Primary Examiner* — Fred M Teskin
(74) *Attorney, Agent, or Firm* — DINSMORE & SHOHL LLP

(57) ABSTRACT

A resin for removing phosphorus from water body, and a preparation method therefor and an application thereof. The particle size of the resin is 0.5-0.8 mm; the resin has a porous structure, the specific surface area is 8-25 $m^2/g$, and the pore size distribution is 3-15 nm, the wet apparent density is 0.68-0.74 $g/cm^3$; the wet true density is 1.12-1.18 $g/cm^3$: and the water content of the resin is 43-57% in percentage by weight. The resin is loaded with a functional group having a lanthanum-oxygen bond, so that the resin can selectively adsorb phosphate radicals in the water body. The resin can selectively remove phosphorus in the water body by using a mode of loading lanthanum on weak acid cation resin and utilizing high selectivity of the lanthanum-oxygen bond to phosphate radicals, is easy to resolve and low in synthesis cost, and can be repeatedly used. Phosphorus in eutrophicated water and waste water can be effectively removed, the content of phosphate radicals in the water body can be controlled within 20 ppm, the phosphorus removal cost of the water body is reduced and the resin has great advantages compared with conventional disposable phosphorus adsorbents.

14 Claims, No Drawings

(56) References Cited

OTHER PUBLICATIONS

Third Office Action of corresponding Chinese Application No. 202011553288.7 dated Mar. 21, 2024.
Chemical analysis of steel raw materials; https://img.duxiu.com/n/jpgfs/book/base/10749243/500c6e0c63c54e89aef497fd777f1c39/c0103612e89cf9e8b3e63cecf1f7c830.shtml?uf=1 &t=1 &, dated Mar. 14, 2024; 5 pages.
First Office Action corresponding to Canadian Application No. 3,187,096 dated Apr. 4, 2024.
Zhang, Yanyang et al., Enhanced Phosphate Removal by Nanosized Hydrated La(III) Oxide Confined in Cross-linked Polystyrene Networks; DOI: 10.1021/acs.est.5b04630 Environ. Sci. Technol. 2016, 50, 1447-1454, 8 pages.
Sowmya, Appunni et al., Phosphate Uptake Studies on Different Types of Lanthanum-Loaded Polymeric Materials, Department of Chemistry, Gandhigram Rural Institute-Deemed University, Gandhigram, Dindigul, Tamil Nadu, India; drs_meena@rediffmail.com (for correspondence) Published online 00 Month 2014 in Wiley Online Library (wileyonlinelibrary.com). DOI 10.1002/ep.11978, 9 pages.
Du, Hongxia, Efficient adsorption, removal and recovery of phosphate and nitrate from water by a novel lanthanum(III)-Dowex M4195 polymeric ligand exchanger, Published on Jan. 10, 2018. Downloaded by James Cook University on Nov. 1, 2018 07:02:06., 9 pages.
Extended European Search Report, Application No. 21909489.3, 28 pages.
Wu. Rudolf S.S., Removal of phosphate from water by a highly selective La(III)-chelex resin, Chemosphere 69 (2007) 289-294, 6 pages.

RESIN FOR REMOVING PHOSPHORUS FROM WATER BODY, AND PREPARATION METHOD THEREFOR AND APPLICATION THEREOF

TECHNICAL FIELD

The present invention belongs to the fields of functional polymers and wastewater treatment. In particular, the present application relates to a resin for removing phosphorus from waste water solution.

BACKGROUND

Phosphorus-containing wastewater is one of the typical industrial wastewaters with extremely serious pollution. Phosphorus-containing wastewater contains a large amount of phosphates, which mainly come from various industrial raw materials, agricultural raw materials and detergents. Once discharged into rivers without proper treatments, it will seriously pollute the natural environment. Phosphorus-containing wastewater will lead to eutrophication of waste water solution, and then lead to the phenomenon of red tide, which will result in abnormal waste water solution, discoloration, water quality deterioration and foul smell and thus worsen the waste water solution conditions, giving a dangerous signal that the water ecology is damaged. In recent years, the deterioration of water quality in rivers, lakes, oceans and other waters has become increasingly serious. Generally speaking, a waste water solution is considered to be in eutrophication when the mass concentration of total phosphorus in the waste water solution exceeds 20 mg/L. Therefore, effective treatment of phosphorus-containing wastewater is of great practical significance. The effective treatment of phosphorus-containing wastewater using targeting processes to enable it to reach a discharging standard is an important topic in environmental protection.

Typical treatment methods of phosphorus-containing wastewater comprise coagulation sedimentation method, crystallization method, ion exchange adsorption method, electrodialysis method, reverse osmosis method, etc. At present, phosphorus is removed from wastewater by mainly using aluminum salts, lime and other materials that can generate insoluble phosphate precipitates with phosphate. However, the method is inefficient when concentrations of phosphorus-containing wastewater are relatively low and thus serious pollutions would be caused. The ion exchange adsorption method can solve this problem very well. However, the existing ion exchange resin for removing phosphate has the problems of low selectivity, slow adsorption rate and low adsorption capacity. The present patent is mainly aimed at optimizing and innovating the ion exchange adsorption method by using lanthanum-oxygen bond to selectively adsorb phosphate ions, so as to improve the adsorption rate and adsorption capacity of the resin. At the same time lanthanum-oxygen bond has high selectivity for phosphate ions. With the rapid development of industry in China, the discharge standards in China are increasingly stringent, so the resin for removing phosphorus has broad application prospects.

SUMMARY OF THE INVENTION

It is found that lanthanum oxide has a high selectivity for phosphorus adsorption through coordination with phosphate ions, and the raw materials of lanthanum are cheap. However, lanthanum oxide is inconvenient to use in practical applications, so it is necessary to find suitable carriers to facilitate the applications. Typical carriers comprise silica gel, molecular sieve, activated carbon, etc. Meanwhile, macroporous ion exchange resin is also a good carrier.

In order to overcome the shortcomings of the prior art, the present invention provides an ion exchange resin for removing phosphorus from waste water solution, which is easy to carry out desorption by using an alkali liquor. Compared with the prior technology for removing phosphorus, the ion exchange resin of the present invention is convenient to use and low in cost, without causing secondary pollutions.

The present invention provides a resin loaded with lanthanum for removing phosphorus, wherein the resin has a particle size of 0.5-0.8 mm; a porous structure with a specific surface area of 8-25 $m^2/g$ and a pore size distribution of 3-15 nm, a wet apparent density of 0.68-0.74 $g/cm^3$; a wet true density of 1.12-1.18 $g/cm^3$; a water content of 43-57% (w/w); and is loaded with a functional group having a lanthanum-oxygen bond to enable selectively adsorbing of phosphate ions from waste water solution by the resin. It is easy to undergo ion exchange with phosphate ions in the system. The resin for removing phosphorus from waste water solution is prepared by a method comprising the following steps of:

- step (1): preparing an oil phase using a monofunctional monomer, a cross-linking agent, a pore-forming agent and an initiator, preparing an aqueous phase using a dispersant and water, preparing a resin via suspension polymerization reaction, and removing the pore-forming agent from the resin after polymerization reaction is completed, obtaining a resin-based sphere;
- step (2): carrying out a chlorination reaction and an amination reaction of the resin-based sphere, and carrying out a hydrolysis reaction by adding an alkali to the resin after the amination reaction, obtaining an amine sphere;
- step (3): reacting the amine sphere with an organic weak acid, obtaining a weak acid cation resin; and
- step (4): loading a lanthanum compound onto the surface of the weak acid cation resin, obtaining a resin for removing phosphorus.

Further, the monofunctional monomer in the step (1) is selected from the group consisting of styrene series, acrylic series, acrylonitrile series and any combination thereof.

The cross-linking agent in the step (1) is selected from the group consisting of divinylbenzene, diisocyanate ester, N,N-methylenebisacrylamide, and any combination thereof. The cross-linking agent is present in an amount of 2-30% (W/W) with respect to the monomer, which means a crosslinking degree of 2-30% (W/W). Preferably, the cross-linking agent is present in an amount of 4-15% (W/W), more preferably 5-10% (W/W), with respect to the monomer.

The pore-forming agent in the step (1) is selected from the group consisting of toluene, isooctane, gasoline, aviation gasoline, n-heptane, cyclohexane, liquid paraffin, white oil and any combination thereof.

The initiator in the step (1) is selected from the group consisting of lauroyl peroxide, benzoyl peroxide, cumene hydroperoxide, tert butyl hydroperoxide, ditert butyl peroxide, diisopropylbenzene peroxide, potassium persulfate, sodium persulfate, ammonium persulfate 2,2'-azobis(2-methylpropionitrile), 2,2'-azobis(2,4-dimethyl)valeronitrile, and any combination thereof.

The dispersant in the step (1) is selected from the group consisting of polyvinyl alcohol, gelatin, fatty acids, aliphatic amides, paraffins, celluloses and any combination thereof.

A ratio of the aqueous phase to the oil phase in the step (1) is 10:1-1:1 V/V.

The suspension polymerization reaction in the step (1) is carried out at a temperature of 40-100° C. using a gradient heating method which comprises heating to 40-60° C. at a first stage, 60-80° C. at a second stage and 80-100° C. at a third stage.

The chlorination reaction in the step (2) is carried out using chloromethyl ether. The chlorination reaction in the step (2) is carried out in the presence of a catalyst selected from the group consisting of zinc chloride, aluminum chloride, ferric chloride, boron trifluoride, niobium pentachloride, trifluoromethanesulfonate and any combination thereof and a solvent selected from the group consisting of methanol, ethanol, acetone, toluene, isopropanol, ether, dimethoxymethane and any combination thereof. The chlorination reaction in the step (2) is carried out at a temperature of 25-50° C. for a period of 1-15 h.

The amination reaction in the step (2) is carried out at a temperature of 50-120° C. The amination reaction is carried outing using an agent selected from the group consisting of phthalimide, ethylenediamine, hexamethylene imine, dimethylamine, trimethylamine, hexaethylenediamine, diethylenetriamine, triethylenetetramine, tetraethylenepentamine and any combination thereof.

The hydrolysis reaction in the step (2) is carried out in the presence of a catalyst selected from the group consisting of sodium hydroxide, potassium hydroxide, calcium hydroxide, sodium bisulfite, sulfuric acid, nitric acid, hydrochloric acid and any combination thereof. The hydrolysis reaction in the step (2) is carried out at a temperature of 85-130° C.

The organic weak acid used in the step (3) for reacting with the amine sphere is selected from the group consisting of chloroacetic acid, chloropropionic acid, dichloroacetic acid, phosphoric acid+formaldehyde, pyrophosphoric acid+formaldehyde, and any combination thereof. Said reacting the amine sphere with an organic weak acid in the step (3) is carried out at a temperature of 40-90° C. Said reacting the amine sphere with an organic weak acid in the step (3) is carried out in the presence of a catalyst selected from the group consisting of sodium hydroxide, potassium hydroxide, calcium hydroxide, sodium bisulfite and any combination thereof.

The lanthanum compound used in the step (4) is selected from the group consisting of lanthanum chloride, lanthanum nitrate, lanthanum sulfate, lanthanum phosphate, the hydrates thereof and any mixture thereof. Said loading a lanthanum compound onto the surface of the weak acid cation resin in the step (4) is achieved by reacting at a temperature of 35-90° C. Said loading a lanthanum compound onto the surface of the weak acid cation resin is achieved by reacting in the presence of a solvent selected from the group consisting of water, methanol, ethanol, formic acid, ethylene glycol, propylene glycol, glycerol, acetic acid, propionic acid, isopropanol, any mixture thereof, and any mixture of water with the above reagents in any ratio. In the step (4), said loading a lanthanum compound onto the surface of the weak acid cation resin is achieved by reacting in the presence of a catalyst selected from the group consisting of sodium hydroxide, potassium hydroxide, calcium hydroxide, sodium bisulfite, ammonia and any combination thereof. Said loading a lanthanum compound onto the surface of the weak acid cation resin in the step (4) is achieved by reacting for 1-30 h.

The macroporous ion exchange resin prepared by present invention can selectively adsorb phosphate ions, hydrogen phosphate ions and dihydrogen phosphate ions from waste water solution but hardly adsorb other anions. The resin is renewable, and thus is more economical and efficient than the traditional disposable phosphorus adsorbents and produces less secondary pollutions.

DETAILED DESCRIPTION OF THE EMBODIMENTS

The present application will be further illustrated with reference to following embodiments. However, these embodiments are only for illustrating, rather than limitations to the present invention detailed in the claims.

Example 1

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 19.4 $m^2/g$ and a median pore diameter of 8.6 nm; a wet apparent density of 0.718 $g/cm^3$; a wet true density of 1.15 $g/cm^3$; and a water content of 47.9% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 7 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 85%.

Example 2

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 10 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 18.7 $m^2/g$ and a median pore diameter of 7.6 nm; a wet apparent density of 0.723 $g/cm^3$; a wet true density of 1.14 $g/cm^3$; and a water content of 45.8% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 14 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 82%.

Example 3

An oil phase is prepared using 20 g 55% (w/w) of divinylbenzene, 80 g of styrene, 50 g of toluene and 1.2 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 60° C. for 2 h, heating up to 80° C. and holding for 2 h, heating up to 95° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 17.9 $m^2/g$ and a median pore diameter of 8.2 nm; a wet apparent density of 0.721 $g/cm^3$; a wet true density of 1.19 $g/cm^3$; and a water content of 46.3% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 21 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 84%.

Example 4

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of carboxymethyl cellulose into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere is mixed with 12 g of chloromethyl ether, 100 g of acetone and 1 g ferric chloride as a catalyst, stirred at 38° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 17.9 $m^2/g$ and a median pore diameter of 7.2 nm; a wet apparent density of 0.731 g/cm$^3$; a wet true density of 1.21 g/cm$^3$; and a water content of 48.5% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 17 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 81%.

Example 5

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 8 h at 90° C., and then 15 g of 8% (w/w) potassium hydroxide is added to perform hydrolysis reaction for 2 h at 160° C. The resulted is washed with water to obtain an amine sphere. 50 g of the amine sphere is mixed with 15 g of chloroacetic acid and then added slowly into 40 g of 20% (w/w) sodium hydroxide solution to perform reaction at 60° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 17.9 m$^2$/g and a median pore diameter of 6.9 nm; a wet apparent density of 0.722 g/cm$^3$; a wet true density of 1.14 g/cm$^3$; and a water content of 48.3% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 16 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 83%.

Example 6

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g lanthanum nitrate and added into 300 ml of 25% (w/w) isopropanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 17.7 m$^2$/g and a median pore diameter of 7.5 nm; a wet apparent density of 0.716 g/cm$^3$; a wet true density of 1.19 g/cm$^3$; and a water content of 44.8% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 16 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 83%.

Example 7

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10%

(w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L potassium hydroxide solution is added dropwise slowly until the system reaches a pH of 11. Stir for 6 h at 50° C. to obtain a resin for removing phosphorus. The prepared resin for removing phosphorus has a particle size of 0.5-0.8 mm; a porous structure with a specific surface area of 15.6 $m^2/g$ and a median pore diameter of 10.5 nm; a wet apparent density of 0.724 $g/cm^3$; a wet true density of 1.23 $g/cm^3$; and a water content of 47.2% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 31 ppm, and the adsorption is stopped.

Wash with 2 BV water. A solution of 8% (w/w) sodium hydroxide+5% (w/w) sodium sulfate is prepared to carry out desorption with 5 BV, and wash with 2 BV water. The desorption rate is 82%.

Example 8

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 19.1 $m^2/g$ and a median pore diameter of 8.2 nm; a wet apparent density of 0.724 $g/cm^3$; a wet true density of 1.17 $g/cm^3$; and a water content of 46.8% (w/w).

5 ml of the resin for removing phosphorus is packed in a column. A 400 ppm sodium orthophosphate solution is prepared and adjusted to a pH of about 6 with 0.5 mol/L hydrochloric acid solution, then passed through the column at a flow rate of 5 BV/h. When 50 ml has been passed through the column for adsorption, the resulted barren solution has a phosphorus content of 31 ppm, and the adsorption is stopped. Wash with 2 BV water. A solution of 6% (w/w) potassium hydroxide+5% (w/w) sodium carbonate is prepared to carry out desorption with 5 BV, and wash with 2 BV water. The desorption rate is 81%.

Example 9

An oil phase is prepared using 20 g 55% (w/w) of divinylbenzene, 80 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 40° C. for 2 h, heating up to 60° C. and holding for 2 h, heating up to 75° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 17.5 $m^2/g$ and a median pore diameter of 9.2 nm; a wet apparent density of 0.723 $g/cm^3$; a wet true density of 1.13 $g/cm^3$; and a water content of 48.2% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 17 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 81%.

Example 10

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 25 g lanthanum phosphate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 18.4 $m^2/g$ and a median pore diameter of 7.5 nm; a wet apparent density of 0.724 $g/cm^3$; a wet true density of 1.11 $g/cm^3$; and a water content of 47.2% (w/w).

5 ml of the resin for removing phosphorus is packed in a column. A 400 ppm sodium orthophosphate solution is prepared and adjusted to a pH of about 4 with 0.5 mol/L hydrochloric acid solution, then passed through the column at a flow rate of 3 BV/h. When 50 ml has been passed through the column for adsorption, the resulted barren solution has a phosphorus content of 13 ppm, and the adsorption is stopped. Wash with 2 BV water. A solution of 8% (w/w) sodium hydroxide+5% (w/w) sodium sulfate is prepared to carry out desorption with 5 BV, and wash with 2 BV water. The desorption rate is 85%.

Example 11

An oil phase is prepared using 30 g 55% (w/w) of divinylbenzene, 70 g of styrene, 70 g of toluene and 1 g of BPO. An aqueous phase is prepared by adding 500 ml of water into a 1 L reaction tank and 0.5 g of polyvinyl alcohol and 1 g of gelatin into the water, and stirring to dissolve. A suspension polymerization reaction is carried out by adding the oil phase into the reaction tank, stirring and holding at 50° C. for 2 h, heating up to 70° C. and holding for 2 h, heating up to 85° C. and holding for 2 h. After completion of the polymerization reaction, toluene is removed by boiling with water at 95° C. for 1.5 h, and the resulted is washed to obtain a resin-based sphere.

50 g of the resin-based sphere are mixed with 12 g of chloromethyl ether, 100 g of dimethoxymethane and 1 g zinc chloride as a catalyst, stirred at 42° C. and kept for 12 hours, and then washed with water to obtain a chlorinated resin. 15 g of phthalimide is added to the chlorinated resin to carry out amination reaction for 10 h at 80° C., and then 15 g of 10% (w/w) sodium hydroxide is added to perform hydrolysis reaction for 2 h at 160° C. The resulted is washed with water to obtain an amine sphere. 50 g of the amine sphere is mixed with 18 g of chloroacetic acid and then added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 19.4 $m^2/g$ and a median pore diameter of 8.6 nm; a wet apparent density of 0.718 $g/cm^3$; a wet true density of 1.15 $g/cm^3$; and a water content of 47.9% (w/w).

5 ml of the resin for removing phosphorus is packed in a column. A 400 ppm sodium orthophosphate solution is prepared and adjusted to a pH of about of about 8 with 0.5 mol/L sulfuric acid solution, then passed through the column at a flow rate of 6 BV/h. When 50 ml has been passed through the column for adsorption, the resulted barren solution has a phosphorus content of 32 ppm, and the adsorption is stopped. Wash with 4 BV water. A solution of 8% (w/w) sodium hydroxide+5% (w/w) sodium nitrate is prepared to carry out desorption with 10 BV, and wash with 4 BV water. The desorption rate is 82%.

Example 12

An oil phase is prepared using 30 g 55% (w/w) of divinylbenzene, 70 g of acrylonitrile, 70 g of isooctane and 1 g of isopropyl benzene hydroperoxide. An aqueous phase is prepared by adding 500 ml of water into a 1 L reaction tank and 0.5 g of carboxymethyl cellulose into the water, and stirring to dissolve. A suspension polymerization reaction is carried out by adding the oil phase into the reaction tank, stirring and holding at 50° C. for 2 h, heating up to 65° C. and holding for 2 h, heating up to 80° C. and holding for 2 h. After completion of the polymerization reaction, isooctane is removed by boiling with water at 95° C. for 1.5 h, and the resulted is washed to obtain a resin-based sphere.

50 g of the resin-based sphere is mixed with 15 g of hexamethyleneimine to carry out amination reaction for 10 h at 80° C. Then 50 g of the resulted amine sphere is mixed with 18 g of chloropropionic acid and added slowly into 50 g of 20% (w/w) sodium hydroxide solution to perform reaction at 50° C. for 10 h. The resulted is washed with water to neutral, obtaining a weak acid cation resin.

50 g of the weak acid cation resin is mixed with 15 g Lanthanum (III) chloride hexahydrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The obtained resin for removing phosphorus has a particle size of 0.5-0.8 mm; a porous structure with a specific surface area of 17.8 $m^2/g$ and a median pore diameter of 8.2 nm; a wet apparent density of 0.727 g/cm$^3$; a wet true density of 1.18 g/cm$^3$; and a water content of 46.5% (w/w).

5 ml of the resin for removing phosphorus is packed in a column. A 400 ppm sodium orthophosphate solution is prepared and adjusted to a pH of about 8 with 0.5 mol/L sulfuric acid solution, then passed through the column at a flow rate of 6 BV/h. When 50 ml has been passed through the column for adsorption, the resulted barren solution has a phosphorus content of 31 ppm, and the adsorption is stopped. Wash with 4 BV water. A solution of 8% (w/w) sodium hydroxide+5% (w/w) sodium nitrate is prepared to carry out desorption with 10 BV, and wash with 4 BV water. The desorption rate is 79%.

Example 13

An oil phase is prepared using 12 g N,N-methylenebisacrylamide, 70 g of acrylonitrile, 70 g of aviation gasoline and 1 g of dicumyl peroxide. An aqueous phase is prepared by adding 500 ml of water into a 1 L reaction tank and 0.5 g of hydroxyethyl cellulose into the water, and stirring to dissolve. A suspension polymerization reaction is carried out by adding the oil phase into the reaction tank, stirring and holding at 50° C. for 2 h, heating up to 75° C. and holding for 2 h, heating up to 90° C. and holding for 2 h. After completion of the polymerization reaction, the aviation gasoline is removed by boiling with water at 95° C. for 1.5 h, and the resulted is washed to obtain a resin-based sphere.

50 g of the resin-based sphere is mixed with 15 g of triethylne tetramine to carry out amination reaction for 10 h at 95° C. 50 g of the resulted amine sphere is mixed with 18 g of dichloroacetic acid and slowly added into 50 g of 20% (w/w) sodium hydroxide solution to perform reaction at 50° C. for 10 h. The resulted is washed with water to neutral, obtaining a weak acid cation resin.

50 g weak acid cation resin is mixed with 15 g lanthanum nitrate and added into 300 ml of 25% (w/w) ethanol solution, and stirred for 2 h at room temperature. Then 200 ml of 1 mol/L sodium hydroxide solution is added dropwise slowly until the system reaches a pH of 13. Stir for 6 h at 60° C. to obtain a resin for removing phosphorus. The prepared resin for removing phosphorus has a particle size of 0.5-0.8 mm; a porous structure with a specific surface area of 16.3 m$^2$/g and a median pore diameter of 7.7 nm; a wet apparent density of 0.734 g/cm$^3$; a wet true density of 1.11 g/cm$^3$; and a water content of 44.7% (w/w).

5 ml of the resin for removing phosphorus is packed in a column. A 400 ppm sodium orthophosphate solution is prepared and adjusted to a pH of about 8 with 0.5 mol/L sulfuric acid solution, then passed through the column at a flow rate of 6 BV/h. When 50 ml has been passed through the column for adsorption, the resulted barren solution has a phosphorus content of 38 ppm, and the adsorption is stopped. Wash with 4 BV water. A solution of 8% (w/w) sodium hydroxide+5% (w/w) sodium nitrate is prepared to carry out desorption with 10 BV, and wash with 4 BV water. The desorption rate is 81%.

We claim:

1. A method for preparing a resin for removing phosphorus from waste water solution, wherein the method comprises the following steps of:

step (1): preparing an oil phase using a monofunctional monomer, a cross-linking agent, a pore-forming agent and an initiator, preparing an aqueous phase using a dispersant and water, preparing a resin via suspension polymerization reaction, and removing the pore-forming agent from the resin after polymerization reaction is completed, obtaining a resin-based sphere, wherein the suspension polymerization reaction in the step (1) is carried out at a temperature of 40-100° C. using a gradient heating method which comprises heating to 40-60° C. at a first stage, 60-80° C. at a second stage and 80-100° C. at a third stage;

step (2): carrying out a chlorination reaction and an amination reaction of the resin-based sphere, and carrying out a hydrolysis reaction by adding an alkali to the resin after the amination reaction, obtaining an amine sphere;

step (3): reacting the amine sphere with an organic weak acid, obtaining a weak acid cation resin; and step (4): loading a lanthanum compound onto the surface of the weak acid cation resin, obtaining a resin for removing phosphorus;

wherein the resin has a particle size of 0.5-0.8 mm; a porous structure with a specific surface area of 8-25 m$^2$/g and a pore size distribution of 3-15 nm; a wet apparent density of 0.68-0.74 g/cm$^3$; a wet true density of 1.12-1.18 g/cm$^3$; a water content of 43-57% by weight; and is loaded with a functional group having a lanthanum-oxygen bond to enable selectively adsorbing of phosphate ions from waste water solution by the resin.

2. The method according to claim 1, wherein the monofunctional monomer in the step (1) is selected from the group consisting of styrene series, acrylic series, acrylonitrile series and any combination thereof; or wherein the cross-linking agent in the step (1) is selected from the group consisting of divinylbenzene, diisocyanate ester, N,N-methylenebisacrylamide, and any combination thereof; or wherein the pore-forming agent in the step (1) is selected from the group consisting of toluene, isooctane, gasoline, aviation gasoline, n-heptane, cyclohexane, liquid paraffin, white oil, and any combination thereof; or wherein the initiator in the step (1) is selected from the group consisting of lauroyl peroxide, benzoyl peroxide, cumene hydroperoxide, tert butyl hydroperoxide, ditert butyl peroxide, diisopropylbenzene peroxide, potassium persulfate, sodium persulfate, ammonium persulfate 2,2'-azobis(2-methylpropionitrile), 2,2'-azobis(2,4-dimethyl) valeronitrile, and any combination thereof; or wherein the dispersant in the step (1) is selected from the group consisting of polyvinyl alcohol, gelatin, fatty acids, aliphatic amides, paraffins, celluloses and any combination thereof.

3. The method according to claim 1, wherein a ratio of the aqueous phase to the oil phase in the step (1) is 10:1-1:1 V/V.

4. The method according to claim 1, wherein the chlorination reaction in the step (2) is carried out using chloromethyl ether; or wherein the chlorination reaction in the step (2) is carried out in the presence of a catalyst selected from the group consisting of zinc chloride, aluminum chloride, ferric chloride, boron trifluoride, niobium pentachloride, trifluoromethanesulfonate and any combination thereof; or wherein the chlorination reaction in the step (2) is carried out in the presence of a solvent selected from the group consisting of methanol, ethanol, acetone, toluene, isopropanol, ether, dimethoxymethane and any combination thereof; or wherein the chlorination reaction in the step (2) is carried out at a temperature of 25-50° C. for a period of 1-15 h.

5. The method according to claim 1, wherein the amination reaction in the step (2) is carried out at a temperature of 50-120° C.; or wherein the amination reaction in the step (2) is carried outing using an agent selected from the group consisting of phthalimide, ethylenediamine, hexamethylene imine, dimethylamine, trimethylamine, hexaethylenediamine, diethylenetriamine, triethylenetetramine, tetraethylenepentamine and any combination thereof.

6. The method according to claim 1, wherein the hydrolysis reaction in the step (2) is carried out in the presence of a catalyst selected from the group consisting of sodium hydroxide, potassium hydroxide, calcium hydroxide, sodium bisulfite, sulfuric acid, nitric acid, hydrochloric acid and any combination thereof; or wherein the hydrolysis reaction in the step (2) is carried out at a temperature of 85-130° C.

7. The method according to claim 1, wherein the organic weak acid used in the step (3) for reacting with the amine sphere is selected from the group consisting of chloroacetic acid, chloropropionic acid, dichloroacetic acid, phosphoric acid+formaldehyde, pyrophosphoric acid+formaldehyde, and any combination thereof; or wherein said reacting the amine sphere with an organic weak acid in the step (3) is carried out at a temperature of 40-90° C.; or wherein said reacting the amine sphere with an organic weak acid in the step (3) is carried out in the presence of a catalyst selected from the group consisting of sodium hydroxide, potassium hydroxide, calcium hydroxide, sodium bisulfite and any combination thereof.

8. The method according to claim 1, wherein in the step (1), the cross-linking agent is present in an amount of 2-30% W/W with respect to the monomer, which means a cross-linking degree of 2-30% W/W.

9. The method according to claim 1, wherein the lanthanum compound used in the step (4) is selected from the group consisting of lanthanum chloride, lanthanum nitrate, lanthanum sulfate, lanthanum phosphate, the hydrates thereof and any mixture thereof; or wherein said loading a lanthanum compound onto the surface of the weak acid cation resin in the step (4) is achieved by reacting at a temperature of 15-90° C.; or wherein in the step (4), said loading a lanthanum compound onto the surface of the weak acid cation resin is achieved by reacting in the presence of a solvent selected from the group consisting of water, methanol, ethanol, formic acid, ethylene glycol, propylene glycol, glycerol, acetic acid, propionic acid, isopropanol, any mixture thereof, and any mixture of water with the above reagents in any ratio; or wherein in the step (4), said loading a lanthanum compound onto the surface of the weak acid cation resin is achieved by reacting in the presence of a catalyst selected from the group consisting of sodium hydroxide, potassium hydroxide, calcium hydroxide, sodium bisulfite, ammonia and any combination thereof; or said loading a lanthanum compound onto the surface of the weak acid cation resin in the step (4) is achieved by reacting for 1-30 h.

10. The method according to claim 1, comprising the following steps of:

preparing an oil phase from 30 g 55% w/w of divinylbenzene, 70 g of styrene, 70 g of toluene and 1 g of BPO, preparing an aqueous phase by adding 500 ml of water into 1 L reaction tank, adding 0.5 g of polyvinyl alcohol and 1 g of gelatin into the water, and stirring to dissolve, carrying out suspension polymerization reaction by adding the oil phase into the reaction tank, stirring and holding at 50° C. for 2 h, heating up to 70° C. and holding for 2 h, heating up to 85° C. and holding for 2 h, and after completion of the polymerization reaction, removing the toluene by boiling with water at 95° C. for 1.5 h, obtaining a resin-based sphere;

carrying out a chlorination reaction by weighing 50 g of the resin-based sphere, adding 12 g of chloromethyl ether and 100 g of dimethoxymethane, adding 1 g zinc chloride as a catalyst, stirring at 42° C. and holding for 12 hours, and then washing with water to obtain a chlorinated resin;

carrying out an amination reaction by adding 15 g of phthalimide to the chlorinated resin and reacting for 10 h at 80° C., then carrying out a hydrolysis reaction by adding 15 g of 10% sodium hydroxide and hydrolyzing for 2 h at 160° C., and washing to obtain an amine sphere; and taking 50 g of the amine sphere, adding 18 g of chloroacetic acid, adding 50 g of 20% w/w sodium hydroxide solution dropwise, reacting at 50° C. for 10 h, and washing to neutral, obtaining a weak acid cation resin.

11. The method according to claim 1, wherein in the step (1), the cross-linking agent is present in an amount of 4-15% W/W with respect to the monomer, which means a cross-linking degree of 4-15% W/W.

12. The method according to claim 1, wherein in the step (1), the cross-linking agent is present in an amount of 5-10% W/W with respect to the monomer, which means a cross-linking degree of 5-10% W/W.

13. The method according to claim 1, wherein said loading a lanthanum compound onto the surface of the weak acid cation resin in the step (4) is achieved by reacting at a temperature of 35-90° C.

14. The method according to claim 1, wherein said loading a lanthanum compound onto the surface of the weak acid cation resin in the step (4) is achieved by reacting at a temperature of 50-70° C.

* * * * *